US008028689B2

(12) United States Patent  
Bruno

(10) Patent No.: US 8,028,689 B2
(45) Date of Patent: Oct. 4, 2011

(54) FOLDABLE CHARCOAL STARTER

(75) Inventor: Adrian A. Bruno, Rolling Meadows, IL (US)

(73) Assignee: Weber-Stephen Products Co., Palatine, IL (US)

( * ) Notice: Subject to any disclaimer, the term of this patent is extended or adjusted under 35 U.S.C. 154(b) by 1062 days.

(21) Appl. No.: 11/688,917

(22) Filed: Mar. 21, 2007

(65) Prior Publication Data

US 2008/0230043 A1   Sep. 25, 2008

(51) Int. Cl.
*A47J 33/00*   (2006.01)

(52) U.S. Cl. ..... 126/25 R; 126/9 R; 126/9 B; 126/25 B; 126/38

(58) Field of Classification Search .......... 126/9 R, 126/38, 25 R, 25 B; D7/416, 417
See application file for complete search history.

(56) References Cited

U.S. PATENT DOCUMENTS

| | | | | |
|---|---|---|---|---|
| 76,707 A * | 4/1868 | Brown | | 126/25 R |
| 594,645 A * | 11/1897 | Nordinger | | 126/25 R |
| 963,769 A * | 7/1910 | Johnson et al. | | 220/6 |
| 1,238,142 A * | 8/1917 | Hitchcock | | 126/29 |
| 1,651,818 A * | 12/1927 | Gorrell | | 110/241 |
| 1,822,448 A * | 9/1931 | Morin | | 312/258 |
| 2,038,226 A * | 4/1936 | Lang | | 126/25 R |
| 2,244,935 A * | 6/1941 | Binger | | 126/9 R |
| 2,357,699 A * | 9/1944 | Stark | | 126/9 R |
| 2,842,116 A * | 7/1958 | Hinderer | | 126/9 A |
| 2,920,614 A * | 1/1960 | Phelps | | 126/25 B |
| 3,013,550 A * | 12/1961 | Murchie | | 126/25 AA |
| 3,035,566 A * | 5/1962 | Keeney | | 126/25 R |
| 3,109,420 A * | 11/1963 | Ott et al. | | 126/9 R |
| 3,146,773 A * | 9/1964 | Melzer | | 126/9 R |
| 3,177,826 A | 4/1965 | Cohen | | |
| 3,296,984 A | 1/1967 | Durfee | | |
| 3,384,066 A * | 5/1968 | Tufts | | 126/9 R |
| 3,447,530 A * | 6/1969 | Santeramo | | 126/25 R |
| 3,494,349 A * | 2/1970 | Allen | | 126/25 B |
| 3,611,912 A * | 10/1971 | Choc | | 99/340 |
| 3,812,840 A * | 5/1974 | Whaler | | 126/275 R |
| 3,858,495 A * | 1/1975 | Gotwalt | | 99/421 HH |
| 3,884,214 A * | 5/1975 | Duncan | | 126/25 B |
| 3,903,866 A * | 9/1975 | Polinski | | 126/25 B |
| 4,023,553 A * | 5/1977 | London et al. | | 126/25 B |
| 4,055,924 A * | 11/1977 | Beaver, Jr. | | 52/262 |
| 4,126,116 A * | 11/1978 | McCallum | | 126/9 R |
| 4,175,925 A | 11/1979 | Paek et al. | | |
| 4,211,206 A * | 7/1980 | Darbo | | 126/9 R |
| D261,347 S * | 10/1981 | Lutz | | D7/337 |
| 4,296,726 A | 10/1981 | Ross et al. | | |
| 4,455,992 A * | 6/1984 | Hsiao | | 126/9 R |
| 4,503,835 A * | 3/1985 | Williams | | 126/25 B |

(Continued)

*Primary Examiner* — Carl Price
(74) *Attorney, Agent, or Firm* — Baker & McKenzie LLP; David I. Roche; Daniel A. Tallitsch

(57) ABSTRACT

Various embodiments of a collapsible charcoal starter are shown, described and claimed herein. In one embodiment, the charcoal starter includes six panels being hingedly interconnected to form a closed loop. The charcoal starter is configured to have an expanded position and a collapsed position, and can be moved therebetween without any disassembly of the charcoal starter. In the expanded position, the six panels form four walls or boundaries, whereby the walls define a volume for receiving charcoal briquettes. In the collapsed position, the six panels are oriented generally parallel. Moreover, four of the panels are sandwiched in between the two remaining panels. In this manner, the depth of the charcoal starter can be significantly reduced as compared to the expanded position, while the width is substantially the same in both the collapsed and expanded positions.

9 Claims, 8 Drawing Sheets

U.S. PATENT DOCUMENTS

| | | | | |
|---|---|---|---|---|
| 4,508,094 A * | 4/1985 | Hait | | 126/9 R |
| 4,510,855 A * | 4/1985 | Avner | | 99/450 |
| 4,510,916 A * | 4/1985 | Ogden | | 126/25 B |
| 4,530,343 A * | 7/1985 | Beck | | 126/9 A |
| 4,624,238 A * | 11/1986 | Hait | | 126/9 R |
| 4,714,013 A * | 12/1987 | Telfer | | 99/449 |
| 4,794,906 A * | 1/1989 | Longley, Jr. | | 126/9 R |
| 4,867,513 A * | 9/1989 | Choi | | 312/258 |
| 4,877,010 A * | 10/1989 | Hait | | 126/9 A |
| 5,134,990 A * | 8/1992 | Bradfield | | 126/25 B |
| 5,404,864 A * | 4/1995 | Kent, Jr. | | 126/9 B |
| 5,469,835 A | 11/1995 | Stephen et al. | | |
| 5,503,138 A * | 4/1996 | Chang | | 126/25 R |
| 5,638,807 A | 6/1997 | Flamenbaum | | |
| 5,785,046 A * | 7/1998 | Colla | | 126/9 R |
| 5,992,406 A * | 11/1999 | Lelle | | 126/33 |
| 6,286,289 B1 * | 9/2001 | Powell et al. | | 52/790.1 |
| D459,154 S * | 6/2002 | Liu | | D7/417 |
| 6,425,387 B1 * | 7/2002 | Rohback, Jr. | | 126/9 R |
| 6,631,711 B2 | 10/2003 | Patience | | |
| 7,802,565 B2 * | 9/2010 | Bruno | | 126/25 R |

\* cited by examiner

FOLDABLE CHARCOAL STARTER

TECHNICAL FIELD

The embodiments described and claimed herein relate generally to an apparatus for assisting in the igniting of charcoal that is typically used on an outdoor grill. More specifically, one embodiment described and claimed herein relates to a collapsible charcoal igniting chimney which is lightweight and compact, and as such is convenient for use with portable barbecue grills.

BACKGROUND OF THE INVENTIONS

Chimney-type charcoal starters are well known in the art. Charcoal starters are configured to enhance and speed the ignition process of charcoal briquettes, which can otherwise be a time-consuming and frustrating exercise. Charcoal starters work by holding the briquettes in intimate contact while using convective forces to drive fresh combustion air over the charcoal. The prior art charcoal starters, however, have many drawbacks. They are typically large devices which are easily transported. See for example, U.S. Pat. Nos. 5,638,807 and 5,469,835. While others have developed so-called portable charcoal starters, the prior art starters are difficult to use, comprise numerous components, and are relatively large, even when placed in a collapsed position. See, for example, U.S. Pat. Nos. 3,296,984; 3,884,214; and 6,631,711.

SUMMARY OF THE INVENTIONS

The various embodiments shown, described, and claimed herein provide a satisfactory means for overcoming at least some of the problems of the prior art.

In one embodiment, a charcoal briquette igniting apparatus is provided, wherein the apparatus includes at least four panels. The panels are hingedly interconnected to form a closed loop, whereby the apparatus is movable between an expanded position and a collapsed position without any disassembly. In the expanded position, the closed loop defines a volume for receiving charcoal briquettes. In the collapsed position, the panels are oriented generally parallel and at least two of the panels are sandwiched between two other panels.

In another embodiment, a charcoal briquette igniting apparatus for a barbecue grill is provided. The apparatus comprises a housing which is movable between an expanded position and a collapsed position without any disassembly of the apparatus. In the expanded position, the housing is defined by at least three walls which are interconnected to form a closed loop. The closed loop defines a volume for receiving charcoal briquettes. At least one of the walls is collapsible, whereby the collapsible wall is disposed at least partially between two of the other walls when the housing is placed in the collapsed position.

In yet another embodiment, a charcoal briquette igniting apparatus comprising a housing is provided. The housing has a first panel, a second panel, a third panel, a fourth panel, a fifth panel, and a sixth panel which are hingedly interconnected to form a closed loop. The housing is movable between an expanded position and a collapsed position without any disassembly of the housing. When the housing is placed in the expanded position, the closed loop defines a volume for receiving charcoal briquettes. When the housing is placed in the collapsed position, the panels are oriented generally parallel and four of the panels are sandwiched between the two remaining panels. The housing has a first width and a first depth when the housing is placed in the expanded position and a second width and a second depth when the housing is placed in the collapsed position. The first width is generally equal to the second width, while the first depth is substantially greater than the second depth.

BRIEF DESCRIPTION OF THE DRAWINGS

These and other features, aspects, objects, and advantages of the embodiments described and claimed herein will become better understood upon consideration of the following detailed description, appended claims, and accompanying drawings where:

Figure 1:
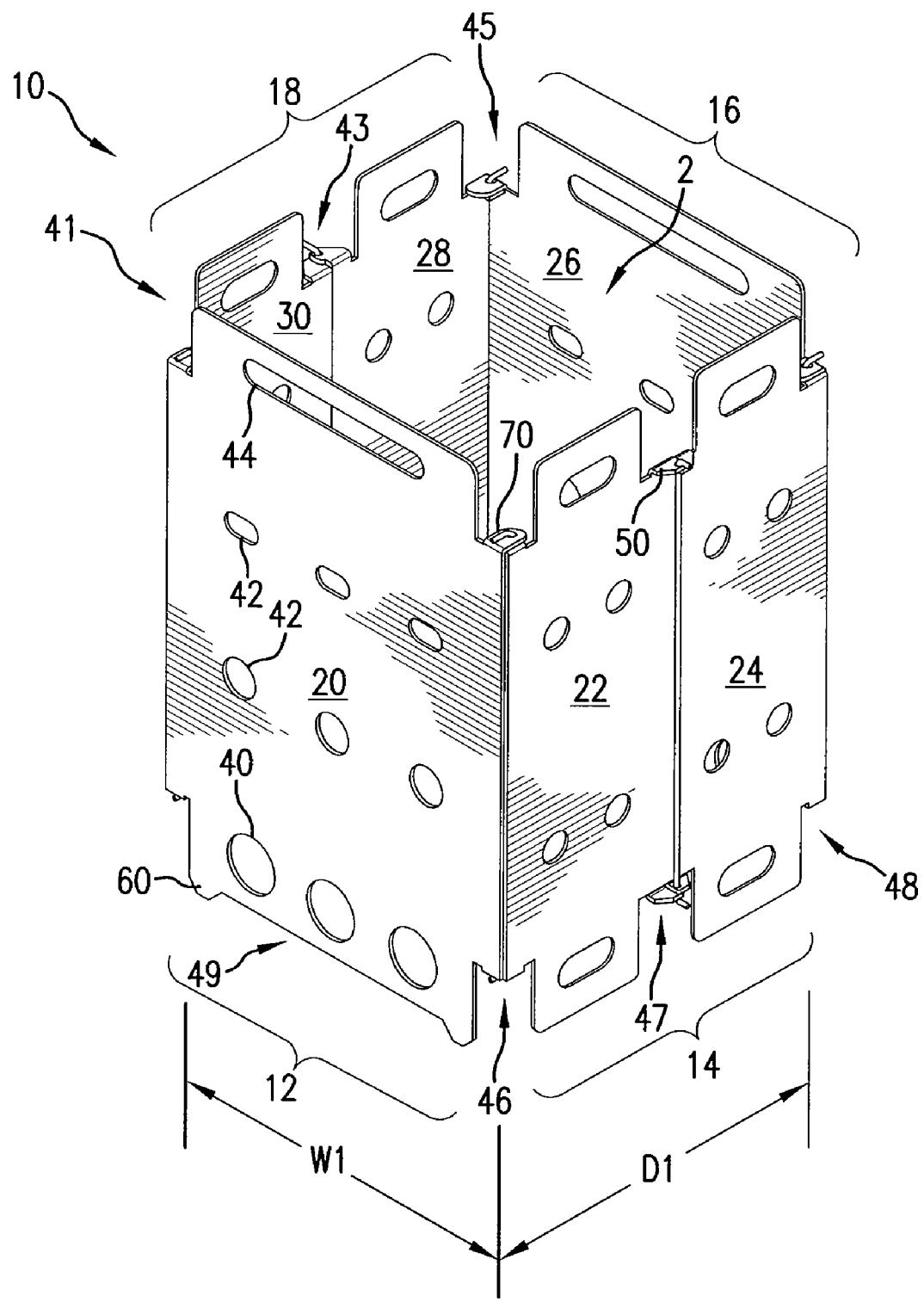
FIG. 1 is a perspective view first embodiment of a collapsible charcoal starter shown in the expanded position.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art of grill design may devise a number of alternative configurations that are similar and equivalent to the embodiments shown and described herein without departing from the spirit and scope of the claims.

Like reference numerals will be used to refer to like or similar parts from figure to figure in the following description of the drawings.

DETAILED DESCRIPTION OF THE DRAWINGS

Figure 2:
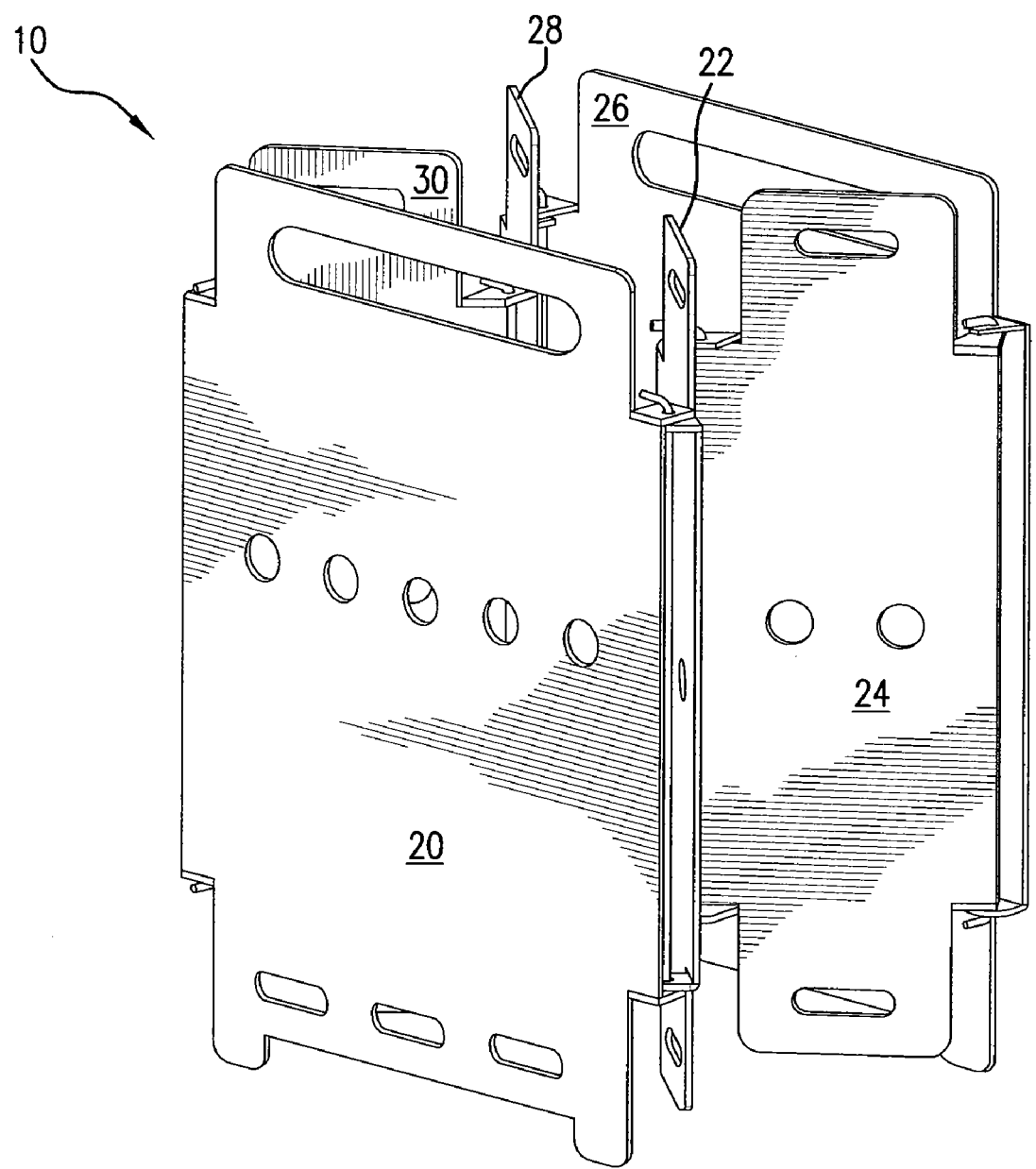
FIG. 2 is a perspective view of the first embodiment of the collapsible charcoal starter shown in a partially collapsed position.
Figure 3:
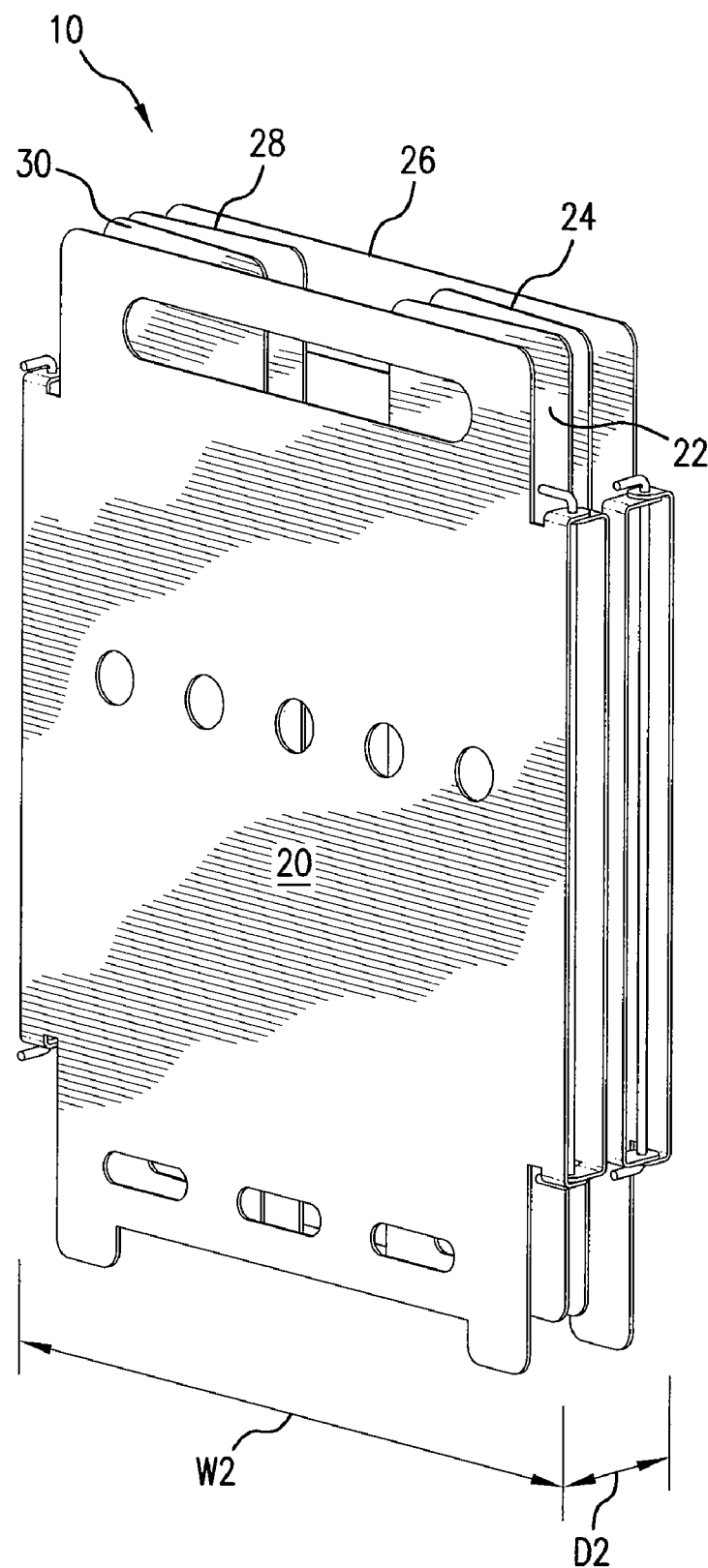
FIG. 3 is a perspective view of the first embodiment of the collapsible charcoal starter shown in the fully collapsed position.
Figure 4:
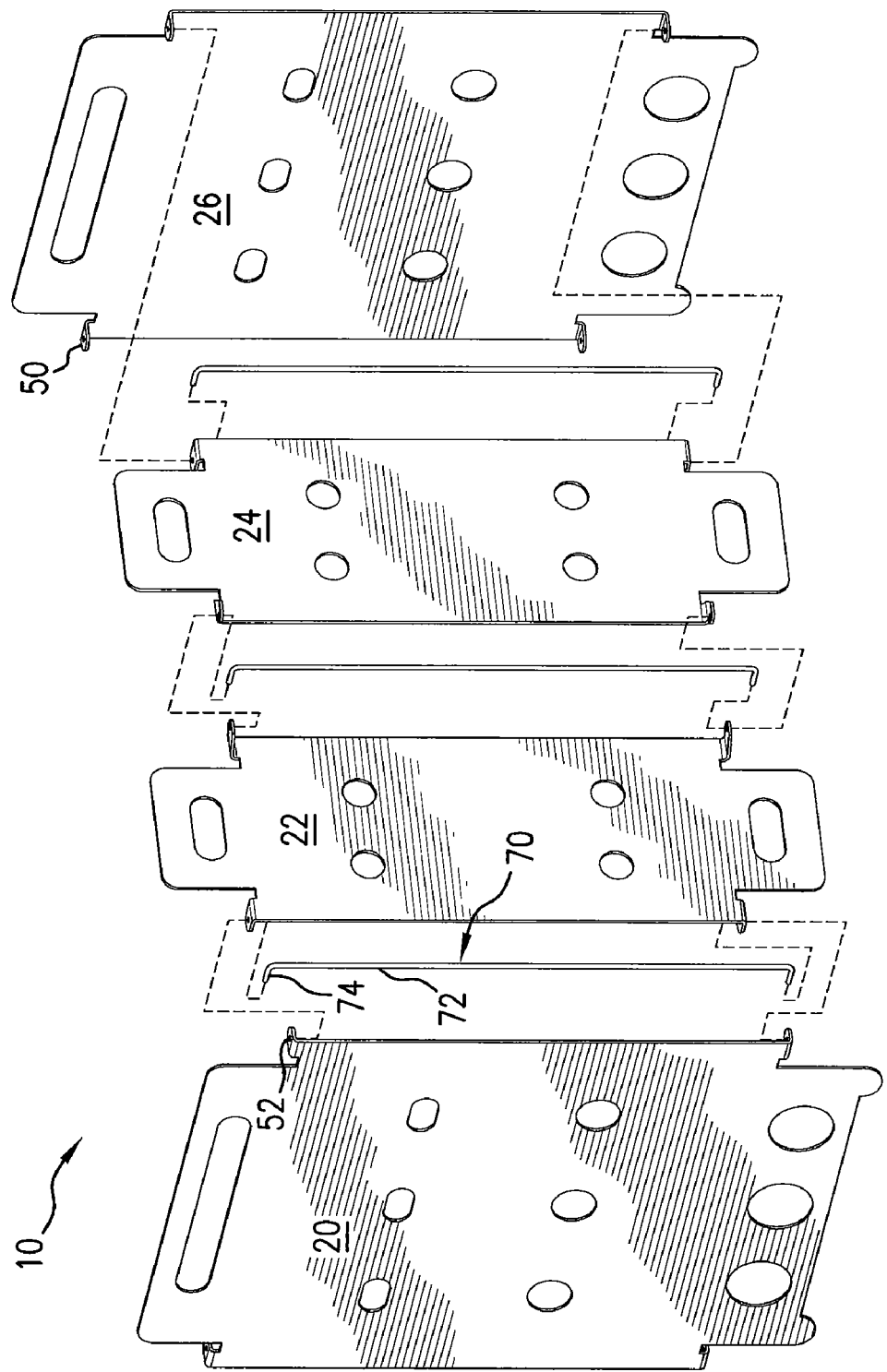
FIG. 4 is an exploded perspective view of the first embodiment of the collapsible charcoal starter (with panels 28, 30 and hinges 70 removed for clarity purposes)

In FIG. 1-5, a first embodiment of a charcoal starter 10 is shown. The charcoal starter 10 is collapsible, in that it is movable from an expanded position, as shown in FIGS. 1 and 4, to a collapsed position, as shown in FIG. 3. The charcoal starter 10 has an intermediate position as shown in FIG. 2. The charcoal starter 10 as shown is a chimney-type charcoal starter having a tubular-like construction with an open top end and an open bottom end. The charcoal starter 10 as shown is relatively easy and inexpensive to manufacture and assemble. The panels 20, 22, 24, 26, 28, 30 of the charcoal starter 10 are stamped and/or formed from sheet metal and are interconnected by hinges 70 formed from round bar stock or the like. As such, no welding is necessary to assemble the charcoal starter.

In use, the charcoal starter 10 rests upright upon a charcoal (or fuel) grate of a barbecue grill and holds charcoal briquettes in intimate contact to speed the ignition process and to ensure more even ignition. Once the charcoal briquettes are adequately and evenly ignited, the charcoal starter 10 is intended to be removed, allowing the briquettes to spread out. In such a manner, the briquettes will provide more even heat for the cooking of food.

Referring first to its expanded position, the charcoal starter 10 includes four walls 12, 14, 16, 18 which are interconnected to form a closed loop. In the expanded position, the closed loop defines a volume 2 for receiving and holding charcoal briquettes during the ignition process. The four walls 12, 14, 16, 18 include a plurality of vents, apertures, or gaps 40, 41, 42, 43, 44, 45, 46, 47, 48, 49 at various locations to allow the inflow of fresh combustion air and the outflow of combustion byproducts. In the embodiment shown in FIGS. 1 and 4, the charcoal starter has a plurality of vents at various locations along the height of each wall, including a plurality of lower vents 40, mid-height vents 42 and upper vents 44. Also, there are several gaps 41, 45, 46, 48 between adjacent walls and several gaps 47, 43 and notches 49 within the walls which provide additional venting capability. Note that the embodiment shown in FIGS. 2-3 include a different number of vents at slightly different locations.

The charcoal starter 10 is configured to be collapsible—without the need for any disassembly of the device—to allow convenient storage of the charcoal starter 10 between uses. To allow the shown charcoal starter 10 to collapse, two of the walls 14, 18 are collapsible and all of the walls 12, 14, 16, 18 are hingedly interconnected. In the embodiment shown in FIGS. 1-4, the two collapsible walls 14, 18 are disposed opposite each other and are configured to inwardly fold such that the two collapsible walls 14, 18 are disposed between (or "sandwiched" between) the two rigid walls 12, 16.

In the expanded position, as shown in FIG. 1, the charcoal starter 10 has a first width W1 and a first depth D1. In the collapsed position, as shown in FIG. 3, the charcoal starter has a second width W2 and a second depth D2. As can be ascertained by FIG. 2, when the collapsible walls 14, 18 are folded inward, the two rigid walls 12, 16 are drawn together. In this manner, the depth of the charcoal starter 10 is significantly reduced when it is placed in the collapsed position. Moreover, the reduction in depth does not come at any significant cost to the width, like in some of the prior art designs. Put in mathematical terms, the first depth D1 is significantly greater than the second depth, while the first width W1 is approximately equal to the second width W2.

While the rigid walls 12, 16 are each comprised of a single panel 20 and 26, respectively, the two collapsible walls 14, 18 are each comprised of a pair of hingedly interconnected panels 22, 24 and 28, 30, respectively, which allow the walls 14, 18 to fold in half in an accordion-like fashion. Put in more descriptive terms, the charcoal starter 10 is comprised of six panels 20, 22, 24, 26, 28, 30. The right side of the first panel 20 is connected to the left side of the second panel 22 by a hinge 70, the right side of the second panel 22 is connected to the left side of the third panel 24 by a hinge 70, the right side of the third panel 24 is connected to the left side of the fourth panel 26 by a hinge 70, the right side of the fourth panel 26 is connected to the left side of the fifth panel 28 by a hinge 70, the right side of the fifth panel 28 is connected to the left side of the sixth panel 30 by a hinge 70, and the right side of the sixth panel 30 is connected to the left side of the first panel 20 by a hinge 70, thereby completing the closed loop. Although the shown charcoal starter 10 incorporates hinges 70 which allow the walls 14, 18 to collapse, it is contemplated that the walls could collapse in other ways, such as telescoping.

Turning now to FIG. 4, an exploded view of the charcoal starter 10 is provided. As shown, each of the panels 20, 22, 24, 26 includes two pairs integrally-formed tabs 50, one pair on each side. Each pair of tabs 50 include vertically aligned apertures 52 formed therein for receiving the hinge 70. While the fifth and sixth panels 28, 30 are not shown in FIG. 4 (for clarity purposes), it is contemplated that the panels 28, 30 are mirror images of panels 22, 24.

While both sets of tabs 50 on the first and fourth panels 20, 26 are inwardly directed, one set of tabs 50 is inwardly directed and the other is outwardly directed on each of the second, third, fifth and sixth panels 22, 24, 26, 28. As better shown in FIG. 5, a top view of the charcoal starter 10, the tab 50 configurations allow the pivot axes P1, P2, P4, P5 at the four corners of the charcoal starter 10 to be disposed inside of the closed loop, while the pivot axes P3, P6 which are disposed within walls 14, 18 are disposed outside of the closed loop.

Figure 5:
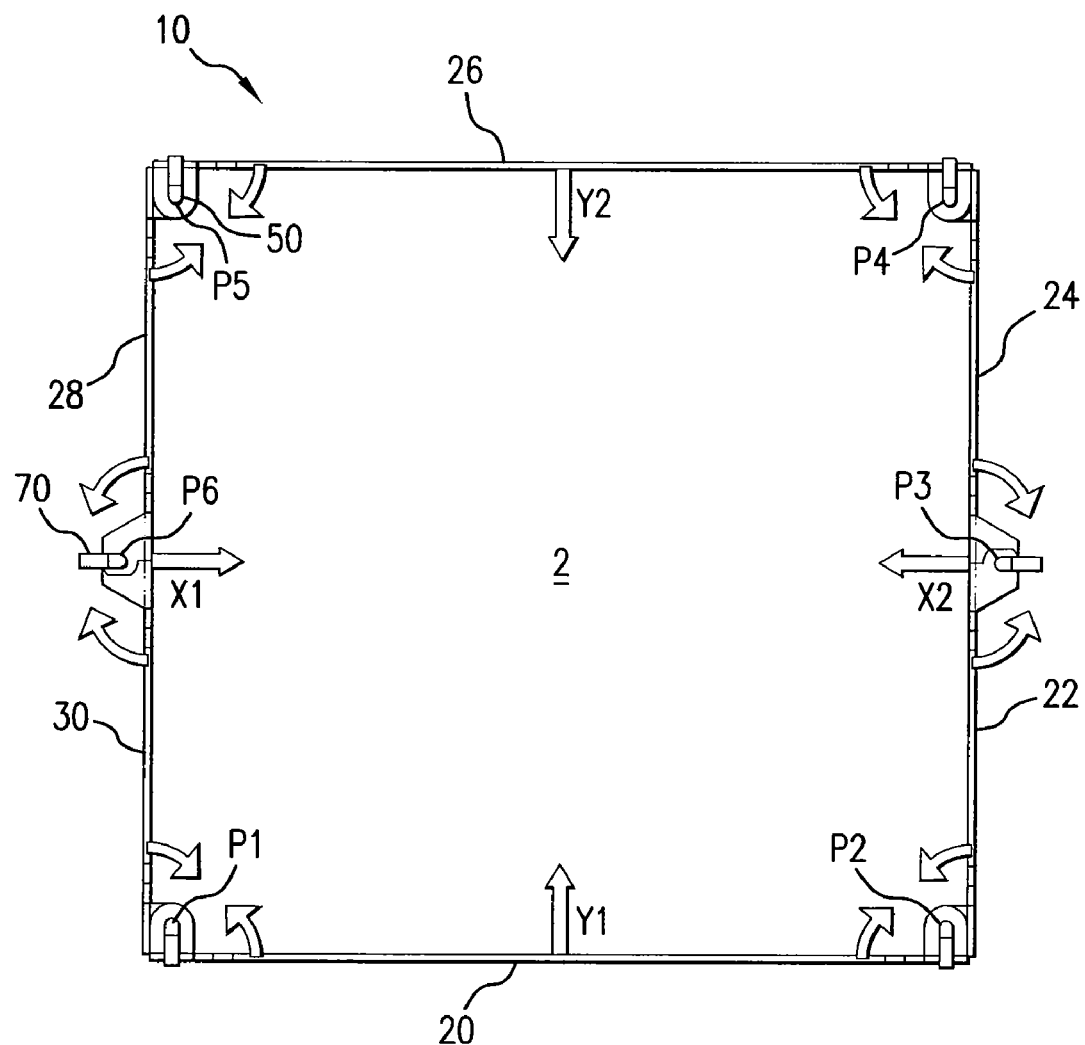
FIG. 5 is a top view of the first embodiment of the collapsible charcoal starter.

FIG. 5 includes arrows which designate the direction about which the panels rotate about the pivot axes P1, P2, P3, P4, P5, P6 when the charcoal starter is moved from the expanded configuration to the collapsed configuration. Using the pivot axis P1 as a frame of reference, the panel 20 can be said to rotate about the pivot axis P1 in the counterclockwise direction while panel 30 rotates in the clockwise direction about the pivot axis P1. Using the pivot axis P2 as a frame of reference, the panel 22 can be said to rotate about the pivot axis P2 in the counterclockwise direction while panel 20 rotates in the clockwise direction about the pivot axis P2. Using the pivot axis P3 as a frame of reference, the panel 22 can be said to rotate about the pivot axis P3 in the counterclockwise direction while panel 24 rotates in the clockwise direction about the pivot axis P3. Using the pivot axis P4 as a frame of reference, the panel 26 can be said to rotate about the pivot axis P4 in the counterclockwise direction while panel 24 rotates in the clockwise direction about the pivot axis P4. Using the pivot axis P5 as a frame of reference, the panel 28 can be said to rotate about the pivot axis P5 in the counterclockwise direction while panel 26 rotates in the clockwise direction about the pivot axis P5. Using the pivot axis P6 as a frame of reference, the panel 28 can be said to rotate about the pivot axis P6 in the counterclockwise direction while panel 30 rotates in the clockwise direction about the pivot axis P6.

FIG. 5 also includes arrows designating the direction in which the panels 20, 26 and the pivot axes P3, P6 move when the charcoal starter is moved from the expanded configuration to the collapsed configuration. The panel 20 moves in direction Y1 towards the panel 26. In turn, the panel 26 moves in direction Y2 towards the panel 20. The pivot axis P3 moves in direction X2 towards pivot axis P6. The pivot axis P6 moves in direction X2 towards pivot axis P3. In this manner, the panels 22, 24, 28, 30 fold inside of and are sandwiched between panels 20, 26 when the charcoal starter is placed in the collapsed position.

Figure 6:
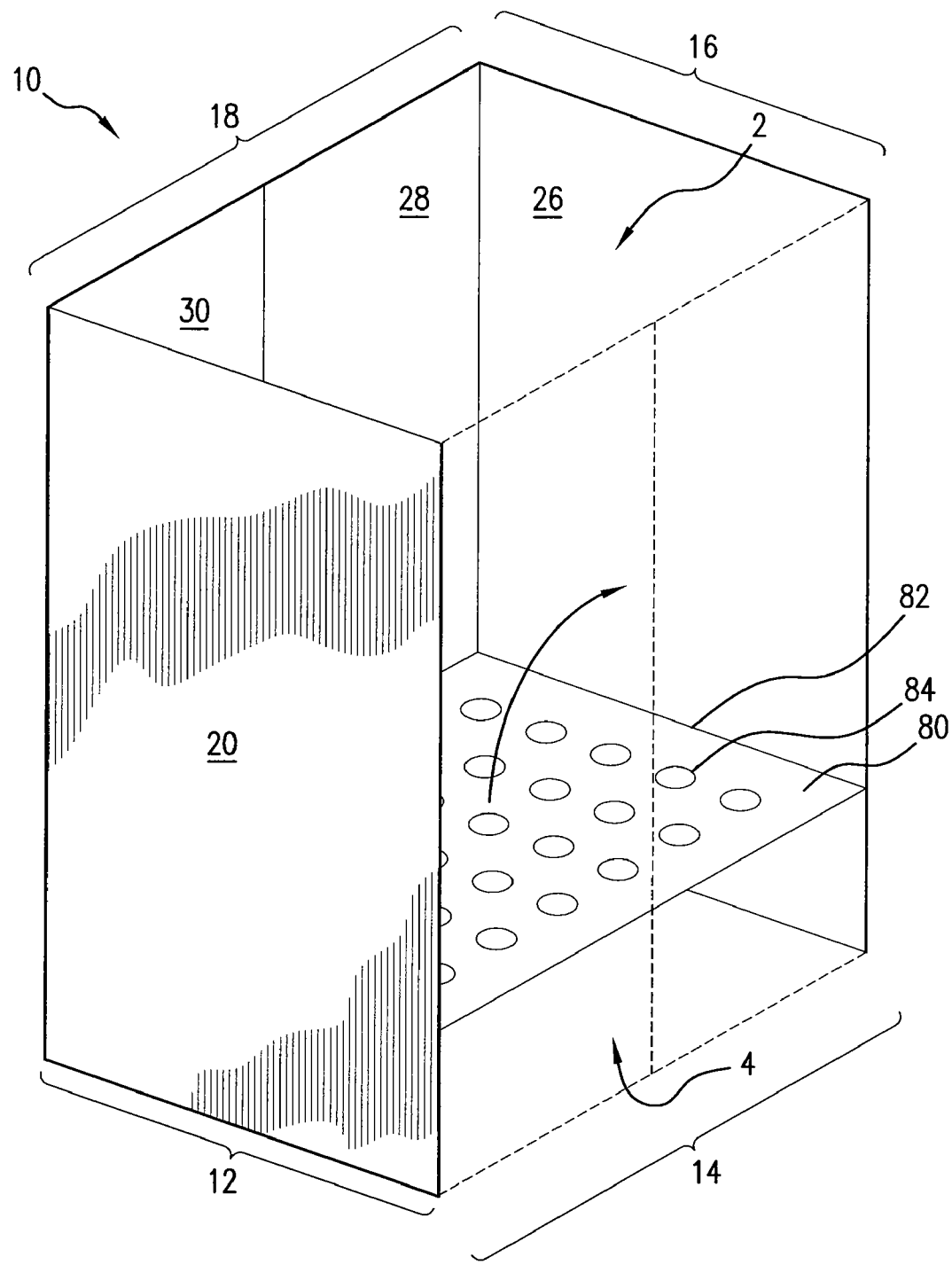
FIG. 6 is a perspective view of a second embodiment of the collapsible which includes a foldable charcoal support member.

A second embodiment of the charcoal starter 10 is shown in FIG. 6. The charcoal starter 10 includes a collapsible floor 80 having a plurality of apertures 84. The floor 80 is configured to divide the charcoal starter into a first volume 2 and a second volume 4 when the charcoal starter 10 is placed in the expanded position. The first volume 2, being above the floor 80, is for receiving charcoal briquettes while the second volume 4, being below the floor 80, is for receiving charcoal starting material, such as newspaper, kindling, fire starter cubes, or the like. In the embodiment shown in FIG. 6, the floor 80 is attached to the panel 26 by means of a hinge 82, such that the floor 80 can be folded generally flush against the panel 26. In this manner, the floor 80 is tucked away in a location where it will not interfere with the collapsible walls 14, 18 when the charcoal starter is moved from the expanded position to the collapsed position.

Although not shown, the floor 80 may engage with a ledge which is formed into or attached to the opposing panel 20. The ledge would support the floor from the underside in a horizontal orientation. Alternatively, the charcoal starter may be configured such that the floor 80 has a length which is greater than the depth D1, wherein the floor would be maintained in a generally horizontal position by interference with the panel 20. Even further, the floor 80 could have a length which is shorter than the depth D1, wherein the far end of the floor 80 (the end opposing the hinge 82) would rest on the charcoal grate. This last alternative configuration may be preferable as it would allow a user to simply lift the charcoal starter 10 after the briquettes are adequately ignited, whereby the briquettes would simply fall through the bottom opening of the charcoal starter 10.

While the particular embodiments previously discussed have four walls 12, 14, 16, 18, it is contemplated that other embodiments can have more or less walls. Moreover, while the walls 12, 14, 16, 18 are generally planar, it is contemplated that the walls can be any shape including curvilinear and discontinuous. Even further, while the charcoal starter 10 is generally square, it is contemplated that the charcoal starter 10 could be any shape, including circular, hexagonal, triangular, etc.

Figure 7:
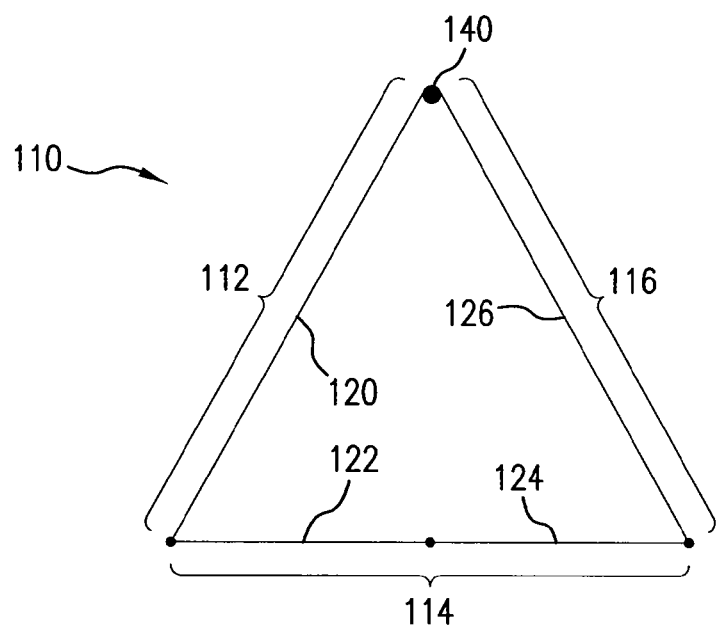
FIG. 7 is a top view of a third embodiment of a collapsible charcoal starter shown in the expanded position.
Figure 8:
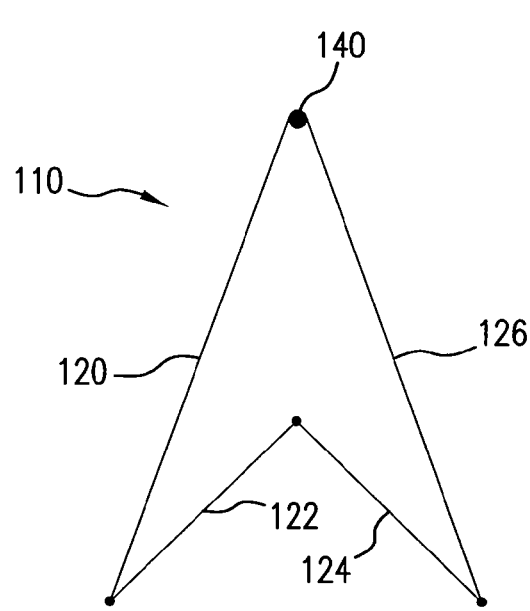
FIG. 8 is a top view of the third embodiment of the collapsible charcoal starter shown in a partially collapsed position.
Figure 9:
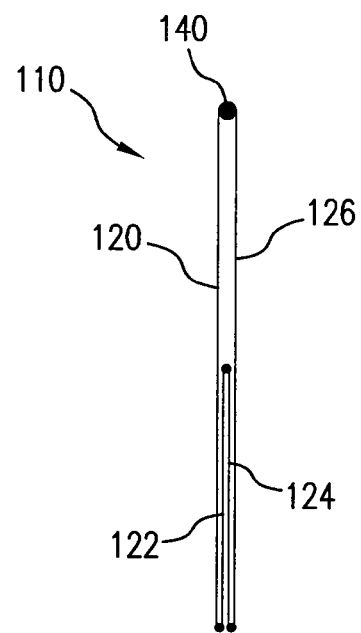
FIG. 9 is a top view of the third embodiment of the collapsible charcoal starter shown in the fully collapsed position; and, FIG. 10 is a partially exploded view of the first embodiment of the collapsible charcoal starter shown in combination with an exemplary charcoal grate.

For example, a third embodiment of a collapsible charcoal starter is shown in FIGS. 7-9. The charcoal starter 110, when placed in the expanded position, as shown in FIG. 7, is defined by three walls 112, 114, 116 forming a closed volume, wherein the wall 114 is configured to collapse inside of the walls 112, 116. The wall 112 comprises a first panel, the wall 114 comprises a second panel 122 and a third panel 124, and the wall 116 comprises a fourth panel 126. Each of the walls are interconnected by a hinge 140, while the panels 122, 124 are interconnected by a hinge 140. The hinge 140 which interconnects the panels 122, 124 allows the panels 122, 124 to inwardly fold, as shown in FIG. 8. In the collapsed position, as shown in FIG. 9, the panels 122, 124 are sandwiched between the panels 120, 126.

Figure 10:
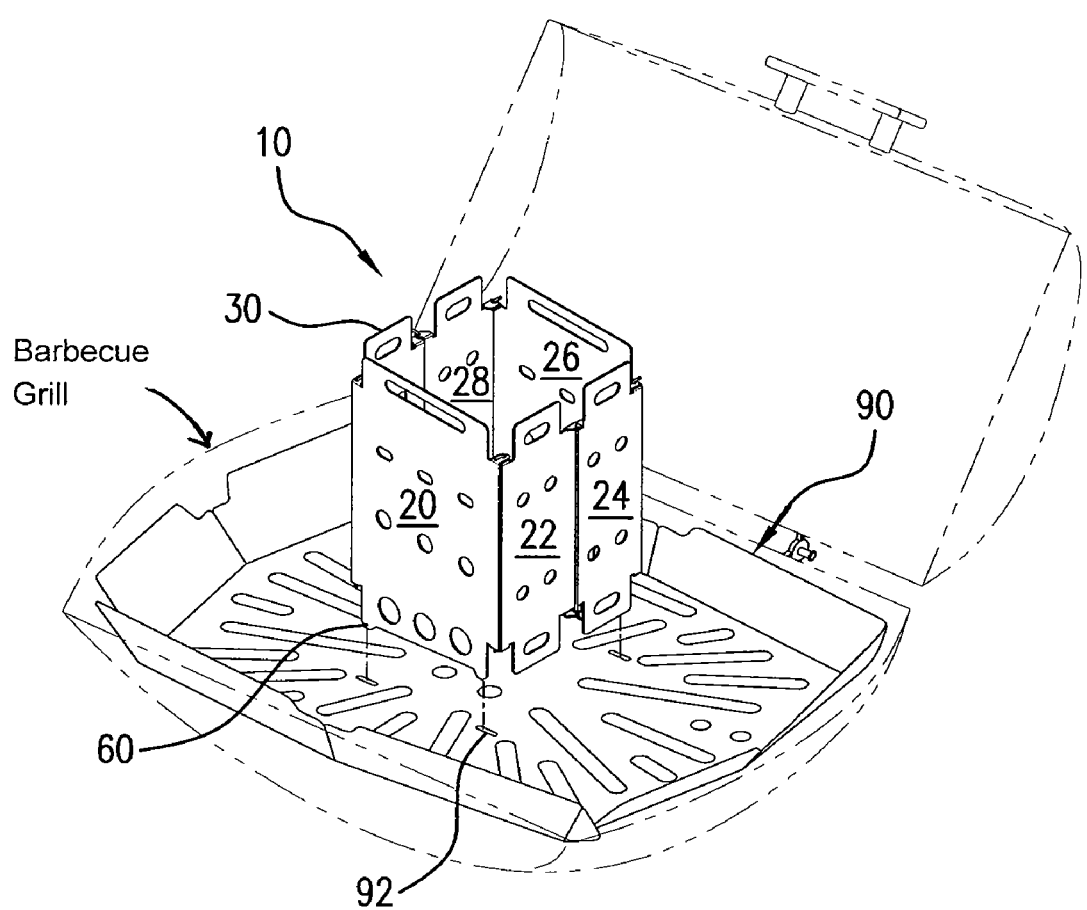

Turning now to FIG. 10, a partially exploded view of the first embodiment of the charcoal starter 10 is shown in combination with an exemplary charcoal grate 90. The charcoal grate 90 engages with a portion of at least one wall of the charcoal starter 10 to prevent significant inadvertent movement of the charcoal starter 10 and possibly to prevent the charcoal starter 10 from collapsing. In the shown embodiment, the charcoal grate 90 includes four apertures 92 which are configured to receive and engage with the four leg portions 60 which depend from the first and third walls 12, 16. Other embodiments of the charcoal starter could include leg portions 60 which depend from any of the walls, 12, 14, 16, 18. For another embodiment of a charcoal grate 90, which includes a plurality of cooking bars which are each spaced apart a fixed distance, it is contemplated that the distance between the opposing walls would be equal to a multiple of the fixed distance, whereby the leg portions would be received in between adjacent cooking bars (in the apertures between adjacent cooking bars).

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

I claim:

1. The charcoal briquette igniting apparatus in a barbecue grill, the charcoal briquette igniting apparatus comprising:
   at least four panels being hingedly interconnected to form a closed loop, whereby the apparatus is movable between an expanded position and a collapsed position without any disassembly of the apparatus;
   wherein the closed loop defines a volume for receiving charcoal briquettes when the apparatus is placed in the expanded position;
   wherein the at least four panels are oriented generally parallel and at least two of the panels are sandwiched between two other panels when the apparatus is placed in the collapsed position;
   one of the panels includes a first leg portion and another of the panels includes a second leg portion; and
   the barbecue grill includes a charcoal grate having at least two apertures receiving the first and second leg portions when the apparatus is placed in the expanded position, whereby engagement between the legs portions and apertures prevents significant inadvertent movement of the apparatus.

2. A charcoal briquette igniting apparatus in a barbecue grill, the charcoal briquette igniting apparatus comprising:
   at least four panels being hingedly interconnected to form a closed loop, whereby the apparatus is movable between an expanded position and a collapsed position without any disassembly of the apparatus;
   wherein the closed loop defines a volume for receiving charcoal briquettes when the apparatus is placed in the expanded position;
   wherein the at least four panels are oriented generally parallel and at least two of the panels are sandwiched between two other panels when the apparatus is placed in the collapsed position;
   wherein the at least four panels comprise a first panel, a second panel, a third panel, a fourth panel, a fifth panel, and a sixth panel;
   wherein the first panel is hingedly interconnected to the second panel, the second panel is hingedly interconnected to the third panel, the third panel is hingedly interconnected to the fourth panel, the fourth panel is hingedly interconnected to the fifth panel, the fifth panel is hingedly interconnected to the sixth panel, and the sixth panel is hingedly interconnected to the first panel;
   wherein in the expanded position, the first panel defines a first wall, the second and third panels collectively define a second wall, the fourth panel defines a third wall, the fifth and sixth panels collectively define a fourth wall, the first wall being opposite and generally parallel to the third wall, the second wall being opposite and generally parallel to the fourth wall, and the first and third walls being generally transverse to the second and fourth walls;
   wherein in the collapsed position, the second and fourth walls are folded inwardly such that the second, third, fifth and sixth panels are sandwiched between the first and fourth panels;

wherein the first panel includes a first leg portion and a second leg portion and the fourth panel includes a third leg portion and a fourth leg portion; and wherein the barbecue grill includes a charcoal grate having at least four apertures receiving the leg portions when the apparatus is placed in the expanded position, whereby engagement between the legs portions and apertures prevents significant inadvertent movement of the apparatus.

3. The charcoal briquette igniting apparatus of claim 2, wherein the apparatus has a first width and a first depth when the apparatus is placed in the expanded position and a second width and a second depth when the apparatus is placed in the collapsed position, the first width being generally equal to the second width and the first depth being substantially greater than the second depth.

4. The charcoal briquette igniting apparatus of claim 2, wherein the first panel has a width which is approximately equal to the width of the fourth panel and which is approximately double the widths of the second, third, fifth, and sixth panels.

5. The charcoal briquette igniting apparatus of claim 2, wherein the hinged connection between the second and third panels is laterally displaced outside of the closed loop to prevent significant outward folding of the second wall.

6. The charcoal briquette igniting apparatus of claim 2, wherein the apparatus further comprises a floor which is adapted for use when the apparatus is placed in the expanded position, whereby the floor divides the volume into a first portion above the floor for receiving charcoal briquettes and a second portion below the floor for receiving charcoal starting material.

7. The charcoal briquette igniting apparatus of claim 6, wherein the floor is foldably attached to one of either the first panel or the fourth panel.

8. The charcoal briquette igniting apparatus of claim 7, wherein the apparatus further includes a hinge for attaching the floor to the fourth panel.

9. The charcoal briquette igniting apparatus of claim 7, wherein the first panel includes a ledge for supporting the floor in a generally horizontal position.

* * * * *